(12) United States Patent
Clarke

(10) Patent No.: US 8,917,939 B2
(45) Date of Patent: Dec. 23, 2014

(54) VERIFYING VENDOR IDENTIFICATION AND ORGANIZATION AFFILIATION OF AN INDIVIDUAL ARRIVING AT A THRESHOLD LOCATION

(71) Applicant: International Business Machines Corporation, Armonk, NY (US)

(72) Inventor: Michael P. Clarke, Ellenbrook (AU)

(73) Assignee: International Business Machines Corporation, Amonk, NY (US)

( * ) Notice: Subject to any disclaimer, the term of this patent is extended or adjusted under 35 U.S.C. 154(b) by 116 days.

(21) Appl. No.: 13/773,007

(22) Filed: Feb. 21, 2013

(65) Prior Publication Data

US 2014/0233855 A1 Aug. 21, 2014

(51) Int. Cl.
  G06K 9/46 (2006.01)
  G06F 17/30 (2006.01)
  G06K 9/00 (2006.01)

(52) U.S. Cl.
  CPC ...... *G06F 17/30477* (2013.01); *G06K 9/00523* (2013.01); *Y10S 707/927* (2013.01)
  USPC ......... 382/198; 705/26.35; 705/317; 707/927

(58) Field of Classification Search
  USPC ......... 382/190; 705/26.35, 317, 318; 707/927
  See application file for complete search history.

(56) References Cited

U.S. PATENT DOCUMENTS

| 6,941,285 | B2 * | 9/2005 | Sarcanin .......................... 705/67 |
| 7,685,631 | B1 * | 3/2010 | Paya et al. .......................... 726/8 |
| 7,708,189 | B1 | 5/2010 | Cipriano |
| 8,132,242 | B1 * | 3/2012 | Wu .................................. 726/8 |
| 2006/0020630 | A1 | 1/2006 | Stager et al. |
| 2006/0265243 | A1 | 11/2006 | Racho et al. |
| 2011/0047384 | A1 | 2/2011 | Jacobs et al. |
| 2011/0248818 | A1 | 10/2011 | Hashim-Waris |
| 2011/0276484 | A1 * | 11/2011 | Pearson et al. ................... 705/44 |

FOREIGN PATENT DOCUMENTS

JP 2008299727 12/2008

* cited by examiner

*Primary Examiner* — Gregory F Cunningham
(74) *Attorney, Agent, or Firm* — Jeffrey S. LaBaw; Amy J. Pattillo

(57) ABSTRACT

A client captures at least one identification indicator of an individual arriving at a threshold representing themself as a vendor of an organization. The client extracts vendor indicia and organization indicia from the captured identification. The client sends a query comprising the organization indicia to an identification service. Responsive to the client receiving a response from the identification service with a network address of a particular identity verification service associated with the at least one organization indicia, the client sends a query comprising the vendor indicia and the current location of the threshold to the particular identity verification service. Responsive to the verification client receiving a response from the particular identity verification service indicating that the user is validated, the client notifies the user that the individual is validated as the vendor of the organization.

20 Claims, 7 Drawing Sheets

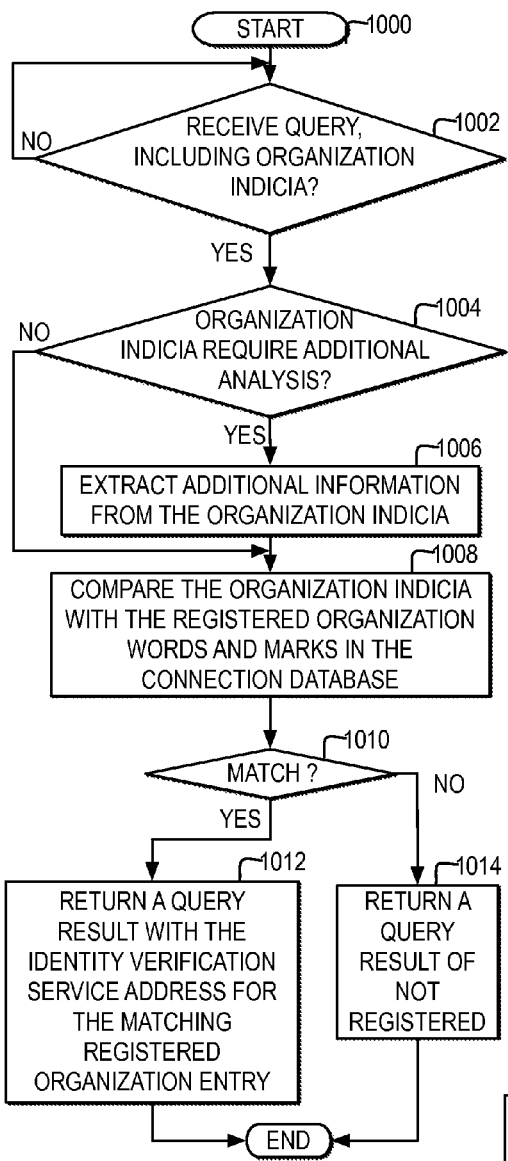
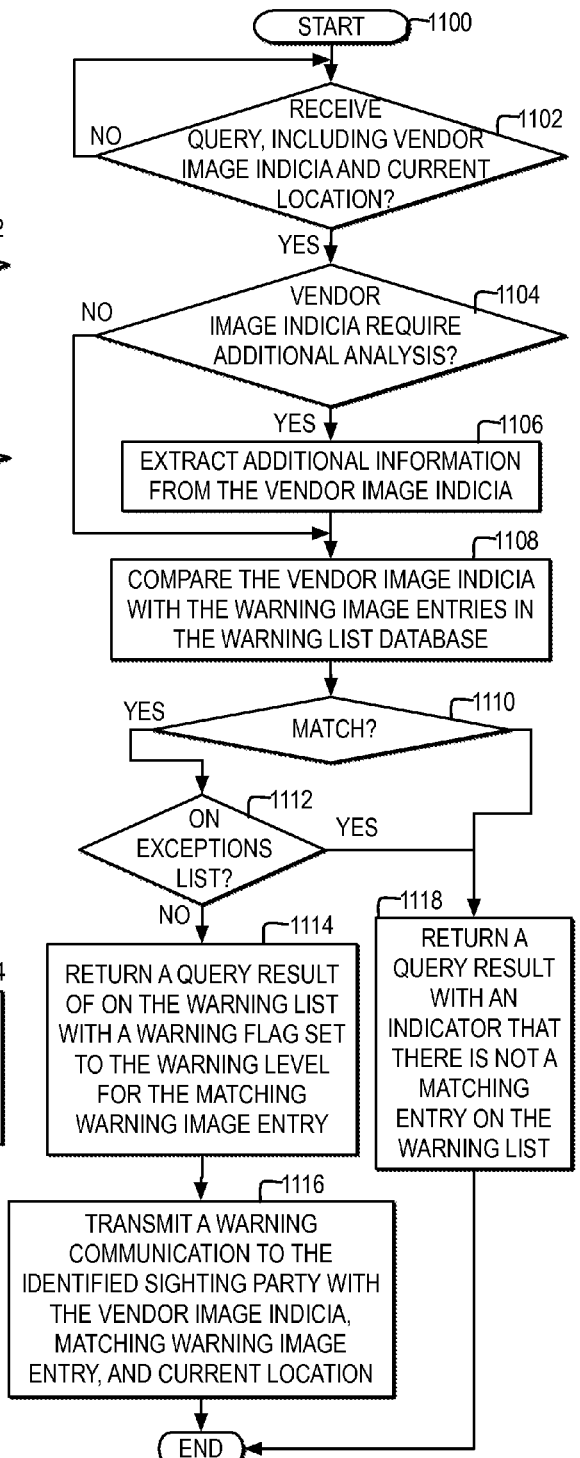
FIG. 10
FIG. 11

VERIFYING VENDOR IDENTIFICATION AND ORGANIZATION AFFILIATION OF AN INDIVIDUAL ARRIVING AT A THRESHOLD LOCATION

TECHNICAL FIELD

The embodiment of the invention relates generally to security systems and particularly to verifying a vendor identification and organization affiliation of an individual arriving at a threshold location using vendor and organization indicia collected from the individual at the threshold location.

DESCRIPTION OF THE RELATED ART

When an individual is present at another person's home, office, tradeshow, or other threshold, representing themself as a vendor of products or services, the individual may wear a uniform or carry an identification card to indicate the individual's affiliation with a particular organization, however, uniforms and identification cards can be copied by unauthorized individuals who misrepresent themselves as affiliates of organizations. Moreover, while an organization may issue identification cards to affiliated vendors that include readable, encoded security data, different organizations may use many different kinds of security badges and employ many different types of security badge readers for reading the encoded security data. A home, office, or other threshold at which individuals arrive, representing themselves as vendors, can not be expected to include every type of encoded data security badge reader, if any, for verifying the identity and organization affiliation of each individual that arrives. An organization that sends vendors out may also publish a phone number that can be called for a user to verify the identity of a vendor claiming an affiliation to the organization, however, a telephone verification only indicates that an individual has provided the name of an authorized vendor, and does not verify that the individual requesting entry at a threshold is actually the named authorized vendor.

BRIEF SUMMARY

In view of the foregoing, there is a need for a method, system, and computer program product for verifying a vendor identification and organization affiliation of an individual arriving at a threshold location using vendor and organization indicia collected from the individual at the threshold location.

In one embodiment, method for verifying vendor identification and organization affiliation is directed to capturing, by a verification client using at least one processor, at least one identification indicator of an individual arriving at a location threshold representing themself as a vendor of an organization. The method is directed to extracting, by the verification client, at least one vendor indicia identifying the individual and at least one organization indicia identifying the organization from the captured at least one identification. The method is directed to sending, by the verification client, at least one first query comprising the at least one organization indicia to an organization identification service that maintains a database of a plurality of organizations each registered with the organization identification by at least one of a plurality of identity verification services. The method is directed, responsive to the verification client receiving a first response from the organization identification service with a network address of a particular identity verification service associated with the at least one organization indicia from among the plurality of identity verification services, to sending, by the verification client, at least one second query comprising the vendor indicia and the current location of the location threshold to the particular identity verification service that maintains a database of records for a plurality of vendors affiliated with the organization. The method is directed, responsive to the verification client receiving a second response from the particular identity verification service indicating that the user is validated, to notifying, by the verification client, the user via a user interface that the individual is validated as the vendor of the organization.

In another embodiment, a system for verifying vendor identification and organization affiliation comprises a verification client operative on at least one processor to capture at least one identification indicator of an individual arriving at a location threshold representing themself as a vendor of an organization. The system comprises the verification client operative to extract at least one vendor indicia identifying the individual and at least one organization indicia identifying the organization from the captured at least one identification. The system comprises the verification client operative to send at least one first query comprising the at least one organization indicia to an organization identification service that maintains a database of a plurality of organizations each registered with the organization identification by at least one of a plurality of identity verification services. The system comprises the verification client, responsive to the verification client receiving a first response from the organization identification service with a network address of a particular identity verification service associated with the at least one organization indicia from among the plurality of identity verification services, operative to send at least one second query comprising the vendor indicia and the current location of the location threshold to the particular identity verification service that maintains a database of records for a plurality of vendors affiliated with the organization. The system comprises the verification client, responsive to the verification client receiving a second response from the particular identity verification service indicating that the user is validated, operative to notify the user via a user interface that the individual is validated as the vendor of the organization.

In another embodiment, a computer program product for verifying vendor identification and organization affiliation comprises one or more computer-readable tangible storage devices. The computer program product comprises program instructions, stored on at least one of the one or more storage devices, to capture at least one identification indicator of an individual arriving at a location threshold representing themself as a vendor of an organization. The computer program product comprises program instructions, stored on at least one of the one or more storage devices, to extract at least one vendor indicia identifying the individual and at least one organization indicia identifying the organization from the captured at least one identification. The computer program product comprises program instructions, stored on at least one of the one or more storage devices, to send at least one first query comprising the at least one organization indicia to an organization identification service that maintains a database of a plurality of organizations each registered with the organization identification by at least one of a plurality of identity verification services. The computer program product comprises program instructions, stored on at least one of the one or more storage devices, responsive to the verification client receiving a first response from the organization identification service with a network address of a particular identity verification service associated with the at least one organization indicia from among the plurality of identity verification services, to send at least one second query comprising the vendor indicia and the current location of the location threshold to the particular identity verification service that maintains a database of records for a plurality of vendors affiliated with the organization. The computer program product comprises program instructions, stored on at least one of the one or more storage devices, responsive to the verification client receiving a second response from the particular identity verification service indicating that the user is validated, to notify the user via a user interface that the individual is validated as the vendor of the organization.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 10 illustrates a high level logic flowchart of a process and program for controlling an organization ID server within a threshold verification system;

FIG. 11 illustrates a high level logic flowchart of a process and program for controlling a warning list server within a threshold verification system.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
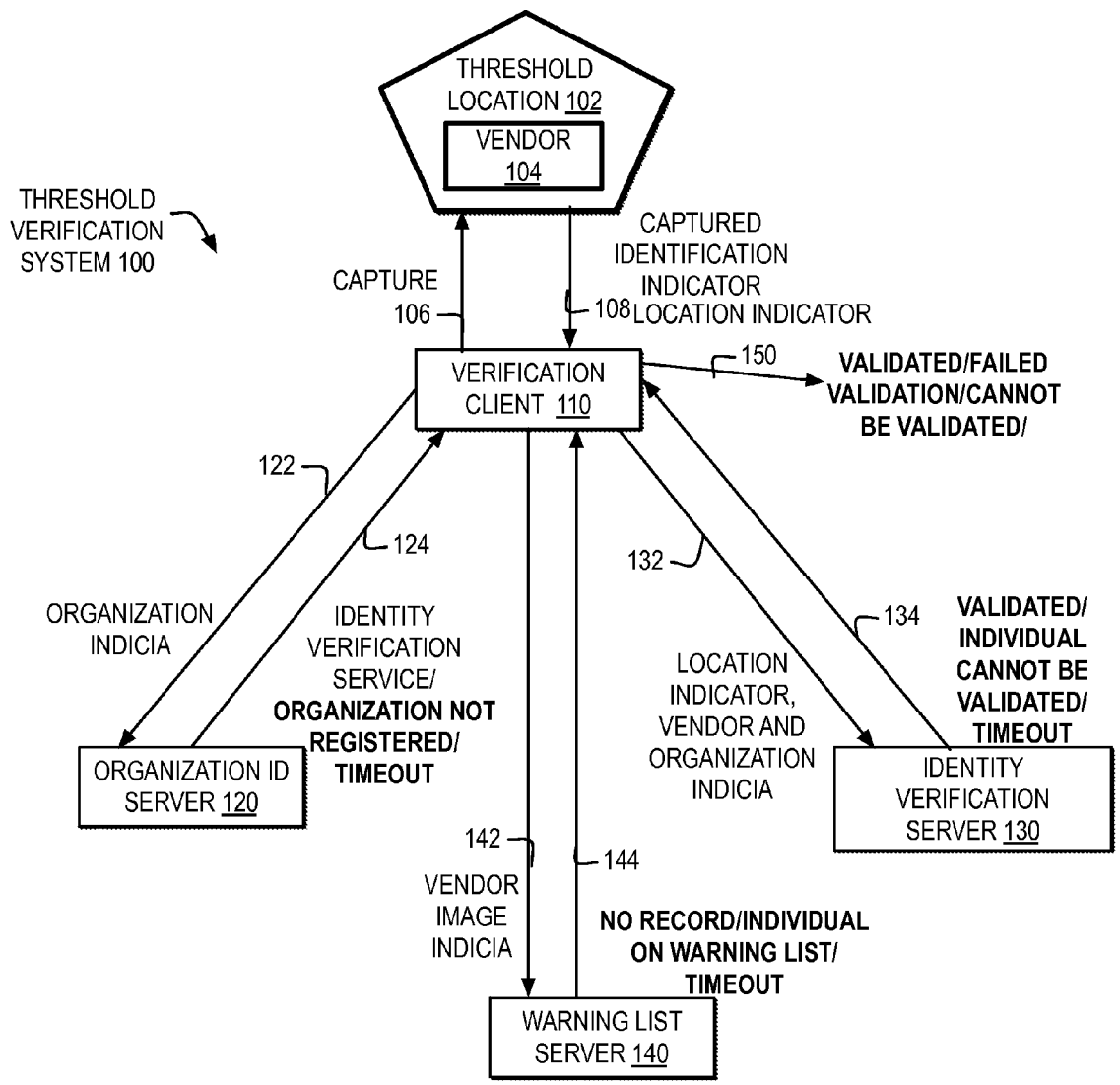
FIG. 1 illustrates a block diagram of one example of a threshold vendor identification and organization affiliation verification system using vendor and organization indicia collected from the individual at a threshold location.

FIG. 1 illustrates a block diagram of a threshold vendor identification and organization affiliation verification system using vendor and organization indicia collected from the individual at a threshold location.

In the example, a threshold verification system 100 includes a verification client 110 communicatively connected to an organization identification (ID) server 120, an identity verification server 130, and a warning list server 140. In additional or alternate embodiments, verification client 110 may communicatively connect with additional or alternate instances of organization ID server 120, identification verification server 130, and warning list server 140. In addition, in additional or alternate embodiments, multiple client systems at one or more locations may communicatively connect with one or more of organization ID server 120, identity verification server 130, and warning list server 140. In additional or alternate example, threshold verification system 100 may include additional or alternate systems. In the example, verification client 110 may run automatically, such as on a security system, or verification client 110 may start running responsive to a user selection to run verification client as an application on a particular system, such as on a user's portable communication device onto which a user may download verification client and select to run verification client 110 and other applications, and which also provides communication services.

In the example, a vendor 104 may include one or more individuals who are present at a threshold location 102. Threshold location 102 may represent a fixed, permanent area or a temporary area, for an entrance point or exit point to access another area. For example, threshold location 102 may represent the area outside the doorway of a home or business or may represent an awaiting area of an office space. Threshold location 102 may include a physical barrier, such as a door, at or through which vendor 104 requests access. Threshold location 102 may represent an area in which vendor 104 is required to wait to receive access into another space. Threshold location 102 may also represent a location through which vendor 102 has traversed and already entered an area that is secured by threshold verification system 100, where identification indicators of vendor 104 are automatically captured as vendor 102 traverses threshold location 102. In addition, for example, threshold location 102 may represent an area that temporarily becomes a threshold for vendor 104, such as a parking lot, a sidewalk, a tradeshow booth or other area in which a user may specify a particular area as a threshold location through which vendor 104 may access another area. In addition, threshold location 102 may be the vendor's storefront, where the user requesting verification of the authenticity of the vendor is the person entering threshold location 102. Threshold location 102 may be any location that is a point of purchase or any other type of location where a user encounters an individual representing themself as an authorized vendor for an organization, as an affiliate of the organization, as a registered attendee of an event hosted by the organization, or as a promoter of the organization, for example. The size and shape of the area represented by threshold location 102 may vary.

Verification client 110 uses one or more devices, in response to a capture request 106, to capture one or more indicia about the organization that vendor 104 claims an association with and about the identity of vendor 104, when vendor 104 is physically present at threshold location 102. Vendor 104 may claim an association with an organization for multiple reasons and in multiple capacities, including, but not limited to to sell or promote a product or service, to participate in an activity or event as a representative of the organization, to participate in an event hosted by the organization as an authorized attendee, or to perform some other function in association with the organization. Indicia may include, but is not limited to, images, sounds, scanned, read or transmitted digital information, and information entered through an interface within threshold location 102 by vendor 104 or through an interface of verification client 110 by a user. Vendor 104 may present an identification card and verification client 110 captures organization indicia from the identification card. Identification cards may include, but are not limited to, badges, paper or digital business cards, smart cards, credit cards, medallions, patches, or other identifying media provided to an authorized vendor that identifies the organization affiliated with the authorized vendor. Verification client 110 may also capture a current location of threshold location 102, in response to capture request 106, if the location of threshold location 102 is not fixed and already known to verification client 110. In one example, verification client 110 may implement one or more types of location detection systems to detect a current location of threshold location 102. For example, if verification client 110 includes an application running on a portable communication device, verification client 110 may request a current location from a location monitoring service of the portable communication device.

In the example, verification client 110 detects captured identification indicators, including, but not limited to, organization indicia specifying information about the claimed organization affiliation of vender 104 and vendor indicia specifying information about the claimed identity of vendor 104, as illustrated at reference numeral 108. In addition, verification client 110 may also receive or access a captured current location indicator.

Verification client 110 initially queries one or more services of an organization ID server 120 with the captured organization indicia, as illustrated at reference numeral 122. Organization ID server 120 operates as a secure, trusted neutral broker that determines whether the organization indicia matches an organization registered with organization ID server 120 and if there is a match between organization indicia and an organization registered with organization ID server 120, organization ID server 120 returns the name and address of an identity verification service registered with organization ID server 120 for the organization Organization ID server 120 may include a database of registered, vetted, organizations, and an identity verification service associated with each organization, so that verification client 110 need only maintain an address for organization ID server 120 for verification client 110 to perform vendor authentication for multiple independent organizations registered through multiple independent identity verification services. In contrast, if organization ID server 120 did not operate as a secure, trusted broker for identifying registered organizations and providing verification client 110 with the address of the identity verification service for each identified registered organization, then each identity verification service may provide a separate verification client and the user would have to download a separate verification client for each of the identity verification services and know which verification client to use for each vendor.

In one example, each organization does not directly register with organization ID server 120. Each organization first registers with an identity verification service, such as the identity verification service hosted by identity verification server 130. Each identity verification service performs the actual registration of each hosted organization with organization ID server 120. Each identity verification service also hosts the verification of employees of the organization, for the organization. Each identity verification service may be required to physically verify the identity of each hosted organization, such as by sending representatives to verify the physical location of an organization headquarters, to protect the integrity of the validation service. Organization ID server 120 may specify one or more requirements of each registering identity verification service to ensure that registering identity verification services only register organizations that have meet a minimum level of security criteria to reduce the chances that a fake organization can register with an identity verification service and to reduce the chances that a fake identity verification service can register with organization ID server 120.

Organization ID server 120 receives queries, as illustrated at reference numeral 122, and returns a response to each query, as illustrated at reference numeral 124. If organization ID server 120 determines the organization indicia matches an organization registered with organization ID server 120, organization ID server 120 returns an identity verification service name and server address assigned to the matching registered organization. If organization ID server 120 determines the organization indicia does not match any of the organizations registered with organization ID server 120, organization ID server 120 returns an indicator that the organization identified in the organization indicia is not registered. If verification client 110 receives an indicator from organization ID server 120 indicating that the organization is not registered, verification client 110 controls an output to one or more user interfaces, as illustrated at reference numeral 150, of "cannot be validated" and may also inform the user that the organization indicia presented by vendor 104 is for an organization that is not registered. If organization ID server 120 cannot complete the query for one or more reasons, verification client 110 may detect a timeout, whether from a failure or timeout response from organization ID server 120 or from a lack of response from organization ID server 120 within a timeout period. When verification client 110 detects a timeout from organization ID server 120, verification client 110 controls an output to one or more user interfaces, as illustrated at reference numeral 150, of "cannot be validated" and may also inform the user the verification service is not available. In addition, if organization ID server 120 determines the organization indicia does not match any of the organizations registered with organization ID server 120, verification client 110 or organization ID server 120 may report the organization indicia and location indicator to a security service or warning list server 140, so the presence of individuals claiming an organization affiliation to an unregistered organization can be tracked in real time. The service provider of organization ID server 120 or identity verification server 130 may provide a user with physical stickers for the user to place at threshold location 102 or digital graphics for the user to include in an interface within threshold location 102 indicating the user requires organization affiliation with organizations registered with organization ID server 120 or hosted by identity verification server 130.

In another embodiment, verification client 110 may maintain one or more addresses for one or more organization specified identity servers in a database, wherein verification client 110 may first check whether verification client 110 already has an address of an identity verification service associated with an organization in the database. If verification client 110 already has an address of an identity verification service associated with an organization in the database, then verification client 110 may omit sending a query to organization ID server 120. Verification client 110 may maintain a database of addresses of identity verification services associated with organizations by storing addresses retrieved from organization ID server 120, by receiving updates to verification client 110 that include addresses of identity verification services associated with organizations, by receiving updates from one or more identity verification services with the names of organizations hosted by the identity verification services, or by a user entering an address of an identity verification service associated with an organization.

In the example, if verification client 110 receives an identity verification service identifier from organization ID server 120, verification client 110 may query one or more services of the identified identity (ID) verification server, such as identity verification server 130, with the location indicator, vendor indicia, and organization indicia, as illustrated at reference numeral 132. Identity verification server 130 determines whether the vendor indicia of vendor 104 match images and other unique information of a vendor registered with identity verifications server 130 for the organization and returns a response to each query, as illustrated at reference numeral 134. In addition, identity verification server 130 logs the location indicator in association with a matching vendor profile and determines, based on the log of locations, whether travel between the logged locations is feasible within the logged times.

If identity verification server 130 determines the vendor indicia matches a vendor record in identity verification server 130 for the organization and identity verification server 130 determines that the travel logged to the current location is feasible, then identity verification server 130 returns an indicator that the vendor is validated, as illustrated at reference numeral 134. If verification client 110 receives an indicator from identity verification server 130 indicating that the vendor is validated, verification client 110 controls an output to one or more user interfaces, as illustrated at reference numeral 150, of "validated" to inform the user that identity verification server 130 has validated the vendor's identity and affiliation with an organization. The output to the user may also indicate the identity of the identity verification service providing the validation and the type or level of authentication performed by the identity verification server, where the identity verification service is selected by the organization, but is also a trusted verification agency entrusted by the organization with vendor identity information and entrusted by the user to validate the identity of vendors associated with an organization.

If identity verification server 130 does not match the vendor indicia with a vendor record or the travel logged to the current location is not feasible, then identity verification server 130 returns an indicator that a vendor cannot be validated to verification client 110. If verification client 110 receives an indicator from identity verification 130 indicating that the vendor cannot be validated, verification client 110 controls an output to one or more user interfaces, as illustrated at reference numeral 150, of "failed validation" to information the user that identity verification server 130 could not identify vendor 104 as one of the authorized representatives for the organizations. If identity verification server 130 cannot complete the query for one or more reasons, verification client 110 may detect a timeout, whether from identity verification server 130 returning a failure or timeout response or verification client 110 detect that a timeout period of time has passed. When verification client 110 detects a timeout for identity verification server 130, verification client 110 controls an output to one or more user interfaces, as illustrated at reference numeral 150, of "cannot be validated" and may also indicate to the user the verification service is not available.

In the example, each organization may select which identity verification service to register with from among multiple identity verification services that are authorized to register organizations with organization ID server 120, such that each organization can independently determine the identity verification service provider that manages the vendor indicia stored about each vendor and such that each organization may receive information about each request for vendor verification of the organization's vendors. Identification verification server 130 may also report vendor requests that have failed validation to warning list server 140 and an organization may select which identity verification service to register with based on the additional security protocols and other features offered by different identification verification services when vendor requests that have failed validation are detected for individuals claiming an affiliation with the organization.

An organization may register with an identity verification service provider that provides identification verification services for a single organization or for multiple organizations. In addition, an organization or group of organizations may select to self-verify by providing its own verification client and identity verification service, with the identity verification service address hardcoded in the verification client, and forego registration with an identity verification service that registers with organization ID server 120. An organization or group may also select to run its own organization ID server 120. In one example, if an organization hosts its own identification verification services, the organization may also limit who can receive verifications from the identification verification service to users with internal security clearance. In one example, an organization may host its own identification verification services for supporting verification clients positioned at threshold locations of a conference, to verify whether an individual requesting access to a conference is a recognized attendee. In another example, an organization may host its own identification verification services so that the organization can push customer information to its vendors about customers requesting vendor verification, using existing customer database information, rather than paying for an external verification service to perform the customer information push service.

In the example, concurrent with verification client 110 sending the organization indicia to organization ID server 120, verification client 110 may also send a query with the vendor indicia, including the vendor image, to one or more services of warning list server 140, as illustrated at reference numeral 142. Warning list server 140 determines whether the vendor indicia match any images or other indicia in a warning list and returns a response, as illustrated at reference numeral 144. If warning list server 140 identifies the vendor indicia within any of the images or other indica in the warning list, warning list server 140 returns a response with a warning that the vendor is is on the current warning list and may trigger additional communications to one or more parties monitoring for the matched individual. In one example, if verification client 110 receives a warning response from warning list server 140, verification client outputs, through one or more user interfaces, a "failed validation" response to the user that overrides any other responses received and may also warn the user that the vendor is identified on a warning list. If warning list server 140 does not identify the vendor indicia in the warning list, warning list server 140 returns an indicator of no record identified and verification client 110 does not override the other responses. If warning list server 140 cannot complete the query for one or more reasons, verification client 110 may detect a timeout for warning list server 140 and verification client 110 may output an indicator of "cannot be validated" and indicate that warning list server 140 could not perform a search for the vendor.

Warning list server 140 may be maintained by a government or law enforcement for the area including threshold location 102 or by a third party security provider subscribed to by verification client 110. The warning list maintained by warning list server 140 may be updated by one or more services, including, but not limited to, vendor images from one or more clients, such as verification client 110, vendor images from one or more identity verification servers, such as identity verification server 130, and images captured from other sources.

In the example, each of verification client 110, organization ID server 120, identity verification server 130, and warning list server 140 may implement one or more types of digital extraction and comparison components to detect and match vendor indicia and organization indicia with registered organizations, authorized vendors and warning list vendors including, but not limited to, facial recognition, optical character recognition (OCR), voice recognition, and decrypting encrypted digital data scanned from an identification card. In addition, given that digital extraction and comparison components operating on captured images and sounds may calculate a percentage of matching visual or audio points, the digital extraction and comparison components within one or more of verification client 110, organization ID server 120, identity verification server 130, and warning list server 140 may assign a percentage probability to each extraction and to each match, where each of verification client 110, organization ID server 120, identity verification server 130, and warning list server 140 may require that a percentage probability of a match reach a particular threshold for a match to be verified or may return indicators that specify the calculated percentage probability.

Verification client 110 controls at least one output interface through which a user is informed of information about the query responses returned by one or more of organization ID server 120, identification verification server 130, and warning list server 140, as illustrated at reference numeral 150. In the example illustrated, a user receives a response of at least one of three levels of validation labeled as "validated", or good, "failed validation", or not a trusted vendor, and "cannot be validated", or not registered or one or more of the services is timed out. While in the example the responses output to the user at reference numeral 150 are illustrated as "validated", "failed validation", and "cannot be validated", in other examples, additional or alternate types of responses may be output. In one example, "validated" may also be output as "good", as a graphical color indicating that a vendor has passed validation, such as green, and may include additional information about which service validated the vendor. In one example, "failed validation" may also be output as "not authorized", as a graphical color indicating that a vendor has not passed validation, such as red, and may include additional information about which service returned an indicator that an individual cannot be validated or a warning indicator. In one example, "cannot be validated" may also be output as "not registered" or "neutral", as a graphical color indicating that no validation can be performed because the vendor's organization is not registered or a timeout occurred, such as white or yellow, and may include information about which service returned one or more indicators output as "cannot be validated".

The output interface of verification client 110 may include selectable options for the user to select to respond to the indicators returned, such as the user selecting to trigger a system to allow vendor 104 access a requested area, the user selecting to send an alert message to a security system, the user confirming that vendor 104 matches the appearance of a photo provided by an organization for the vendor, or the user selecting from among other options.

In the example, threshold verification system 100 provides a system where, if verification client 110 represents an application running on a portable communication device owned by a user, users may request to verify the identity and organization affiliation of vendors arriving at threshold location 102 using the portable communication device commonly carried by the user. In addition, threshold verification system 100 provides a system through which organizations can register to provide vendor verification as a service to potential customers and through which organizations can monitor the movement of authorized and unauthorized vendors. Moreover, threshold verifications system 100 provides a system through which law enforcement or security services can monitor, in real time, for the presence and location of individuals misrepresenting themselves as authorized vendors of one or more organizations.

Figure 2:
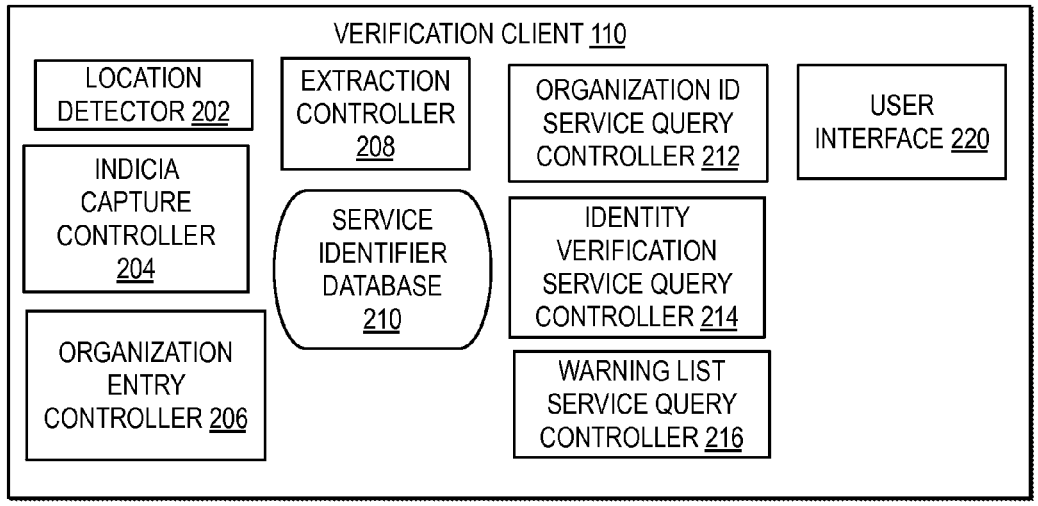
FIG. 2 illustrates a block diagram of one example of a verification client implemented in a threshold verification system.

FIG. 2 illustrates one example of a block diagram of a verification client implemented in a threshold verification system.

In the example, verification client 110 includes a location detector 202 for detecting a current location of threshold location 102. In one example, a user preprograms a location of threshold location 102 through location detector 202, such as when verification client 110 is implemented as part of a security system and threshold location 102 is a fixed entrance point. In another example, a location detector 202 may access a current location from a location tracking service, such as when verification client 110 is controlled by an application on a portable communication device and the detected location of threshold location 102 is the location of the portable communication device as tracked by a location tracking service for the portable communication device. In another example, location detector 202 may control an interface through which a user may select a location from a list of pre-programmed locations or through which a user may enter the coordinates of a location.

Figure 3:
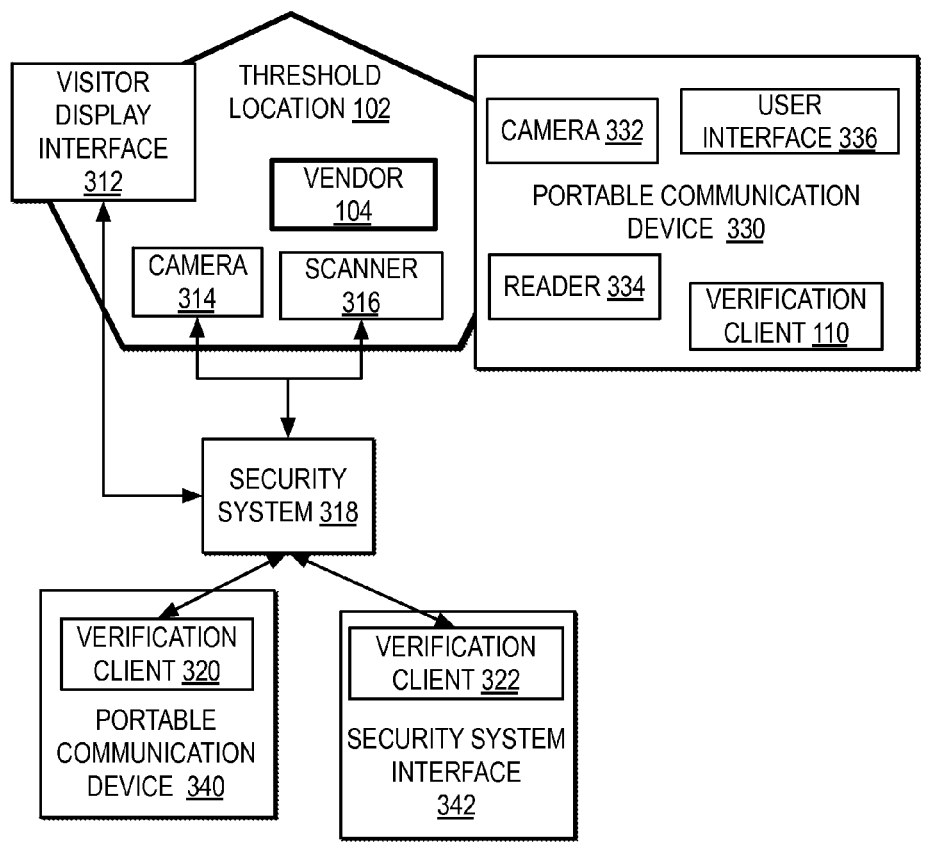
FIG. 3 illustrates a block diagram of examples of systems on which a verification client is implemented in a threshold verification system.

In the example, verification client 110 includes an indicia capture controller 204 for detecting one or more of an video image and audio sample of vendor 104, a reading of an identification card presented by vendor 104, or other captured information observable about vendor 104 within threshold location 102. In one example, indicia capture controller 204 may access the output from one or more cameras or other image or audio capture devices for capturing an image and sounds made by vendor 104. For example, as illustrated in FIG. 3, indicia capture controller 204 may access the video or audio feed captured by a camera 314 within threshold location 102 or an identification card image scanned by a scanner 316 within threshold location 102, from a security system 318 that implements camera 314, scanner 316, and other capture devices, where the output from security system 318 is securely accessible to one or more verification clients 320 and 322, such as a security system for a building where the video and audio feed or identification card information captured of individuals present at the front door of the building is securely accessible via a network connection to one or more clients registered to one or more residents of the building. In another example, indicia capture controller 204 may access images captured by a camera 332 of a portable communication device 330 running a verification client 336. In addition, portable communication device 330 may include a reader 334, which may be an attachment to portable communication device 330, through which an identification card is read. In one example, reader 334 may be a credit card reader that attaches to an input port of portable communication device 330, reads data from the data strip implemented on a plastic card, and provides the data to portable communication device 330, where for purposes of verification client 336, reader 334 reads vendor identification information from a magnetic data strip, RFID chip, or other data medium of an identification card presented by vendor 104 and indicia capture controller 204 captures the vendor identification information. Moreover, reader 334 may read encrypted data from an identification card presented by vendor 104, where the encrypted data is transmitted with the vendor indicia or organization indicia to organization ID server 120 or identity verification server 130 for decryption.

In the example, verification client 110 may also include an organization entry controller 206 for accessing information which vendor 104 or an authorized user of verification client 110 may input through a user interface about the organization that vendor 104 claims an association with. In one example, threshold location 102 may include a visitor display interface 312 of security system 318 through which vendor 104 enters information, where organization entry controller 206 of verification client 320 or verification client 322 detects inputs by vendor 104 through visitor display interface 312. In another example, portable communication device 330 may implement a user interface 336 through which organization entry controller 206 accesses information the user enters about what the observes about the organization affiliation of vendor 104.

In the example, extraction controller 208 extracts vendor indicia and organization indicia from captured identification indicators accessed by indicia capture controller 204 and organization entry controller 206. In one example, extraction controller 208 may scan captured images using facial recognition components to extract facial images and using optical character recognition components to extract text and may scan audio samples using voice recognition components to extract vocal identification points. In one example, extraction controller 208 receives video images and an audio sample from indicia capture device 204 and extracts a facial recognition based image of the vendor from the video image as vendor indicia and extracts text from an image of an identification card provided by the vendor or items of clothing worn by the vendor, as organization indicia. In another example, extraction controller 208 extracts vendor indicia and organization indicia from vendor identification information read by a scanner or reader, such as scanner 316 or reader 334.

Verification client 110 accesses a service identifier database 210 identifying one or more addresses for organization ID server 120 and warning list server 140. Organization ID service query controller 212 queries the organization ID server identified in service identifier database 210 with the organization indicia extracted by extraction controller 208. If organization ID service query controller 212 receives an identification verification service address from the queried organization ID server, identity verification service query controller 214 queries the identity verification server address with the location indicator identified by location detector 202 and the vendor indicia and organization indicia extracted by extraction controller 208. Separately, warning list service query controller 216, queries the warning list server identified in service identifier database 210 with the vendor image indicia, at the least, As organization ID service query controller 212, identity verification service query controller 214 and warning list service query controller 216 receive responses, user interface 220 controls response updates to one or more output interfaces. User interface 220 provides the user with information about whether the organization affiliation claimed by vendor 104 is a registered organization as "cannot be validated", whether the vendor identity claimed by vendor 104 is verified by the organization as "validated" or whether the vendor identity claimed by vendor 104 fails verification as "failed validation", whether vendor 104 is on a warning list maintained by law enforcement or security services as "failed validation", and whether any of the services queried by organization ID service query controller 212, identity verification service query controller 214, and warning list service query controller 216 return a response that the query timed out as "cannot be validated". User interface 220 may also output the identity of the service provider queried by identity verifications service query controller 214, such that the user may determine a level of confidence to assign to the results based on the identity of the service provider or wherein a performance rating for the service provider can be accessed from a third party service that monitors the performance rating of identity verification services and the performance rating can also be displayed in user interface 220. In one example, a user may assign a greater level of confidence to an identity verification service provider that is well known or well rated and the user may assign a different level of confidence to an identity verification service provider that is hosted by the organization itself versus one that is hosted by a third party. User interface 220 may also provide the user with selectable options based on the information received about vendor 104 from organization ID service query controller 212, identity verification service query controller 214, and warning list service query controller 216.

In addition, verification client 110 may enable registered organizations to send, via organization ID server 120 and identity verification server 140, additional information or requests for output via user interface 220 to provide additional information to a user about the organization and product or service offered by a vendor, to provide options to rate or review the product or service offered by a vendor, to provide options for a user to purchase or sign up for a product or service offered by a vendor, and to provide options for a user to select an account to authorize to charge for a purchase. In addition, organization ID server 120 and identity verification server 140 may push requests, via verification client 110, to open separate applications specified for an organization, product, or service. Moreover, verification client 110 may be automatically opened by one or more separate applications specified for one or more organizations, products, or services. Additionally, verification client 110 may be integrated within an existing application, such as a finance based application that enables a user to charge a purchase to an account, but verification client 110 enables the purchaser to verify that the vendor of the product is authenticated, where threshold location 102 is a point of purchase, prior to the user authorizing the purchase to an account. By enabling registered organizations to push additional information and requests to verification clients, in addition to providing potential customers with a customer service of real-time authentication of vendors of the organization, organizations receive an additional incentive to register with identity verification services as registered organizations may push additional communications and confirm purchases via verification client 110 or another application triggered through verification client 110, along with providing potential customers with vendor identity validation. In addition, in enabling registered organizations to push information and requests to verification clients, the organization may also push or specify a script to run if the user elects to respond to a request.

In the example, with reference to FIG. 3, verification client 320 is implemented on a portable communication device 340 that communicatively connects via a network to security system 318 and also provides communication services. In the example, verification client is implemented in a fixed security system interface 342 that is hardwired to security system 318. In other examples, portable communication device 330 may access captured identification indicators from security system 318 or from other systems that access security system 318, such as from portable communication device 340 or security system interface 342.

In one example, when vendor 104 approaches a user's office and requests to provide more information about a product or service to the user, the user picks up portable communication device 330, launches verification client 110 as an application on portable communication device 330, points camera 332 on portable communication device 330 at vendor 104 and selects to take a photo of vendor 104. In addition, the user either takes a photo of the vendor identification card using camera 332 or places the vendor identification card through reader 334, and if necessary, the user enters additional information through user interface 336 indicating the organization vendor 104 claims an affiliation with. Verification client 110 sends queries to organization ID server 120, identity verification server 130, and warning list server 140 to determine if the individual claiming affiliation with an organization is an authorized vendor of the organization. The user receives, at the user's portable communication device, indicators of whether vendor 104 is a trusted vendor so the user can decide, based on multiple security queries based on information captured about the vendor, information captured by the organization, and the current location, whether to interact with vendor 104.

Figure 4:
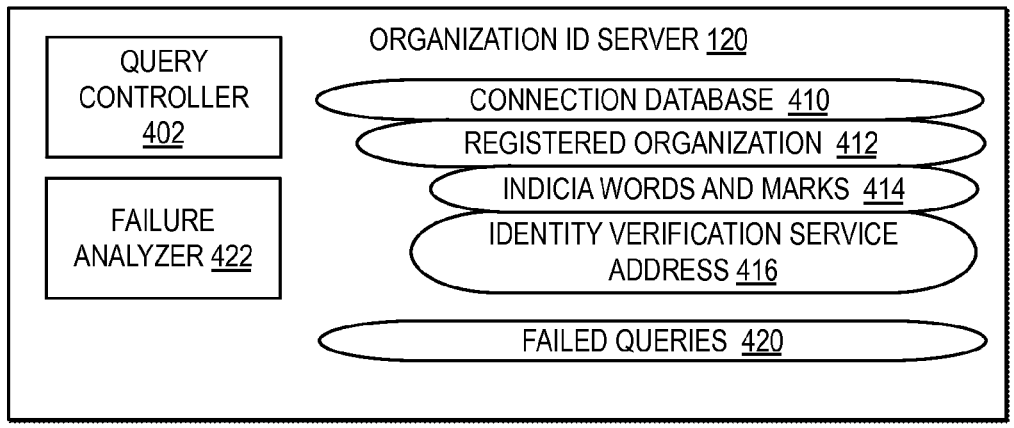
FIG. 4 illustrates a block diagram of one example of one or more components of an organization ID server.

FIG. 4 illustrates a block diagram of an example of one or more components of an organization ID server. In the example, organization ID server 120 includes a query controller 402 for receiving queries from multiple verification clients and returning results to verification clients. Query controller 402 receives a query with organization indicia and looks up the organization indicia in a connection database 410. In the example, connection database 410 includes a separate record for each registered organization 412 that includes indicia words and marks 414 that identify the organization and specifies an identity verification service address 416 of the identity verification service that registered the organization with organization ID server 120 and that provides identity verification services for the organization. Query controller 402 compares the query organization indicia with indicia words and marks 414 for each registered organization 412. If the query organization indicia match indicia words and marks for a particular registered organization, query controller 402 returns the particular identity verification service address of the particular registered organization to the querying verification client. If the query organization indicia do not match any indicia words and marks in connection database 410, query controller 402 returns an indicator that the query failed and the organization cannot be verified and stores a record of the failed query in failed queries 420. Records within failed queries 420 may be further analyzed by a failure analyzer 422 to identify patterns of unregistered organization queries occurring in real-time and to send information about patterns of unregistered organization queries to registered identity verification services, registered verification clients, warning list server 150, and other third parties. Registered identity verification services may receive information about unregistered organization queries and attempt to contact a representative of the organization to offer hosting and verification services to the organization.

Figure 5:
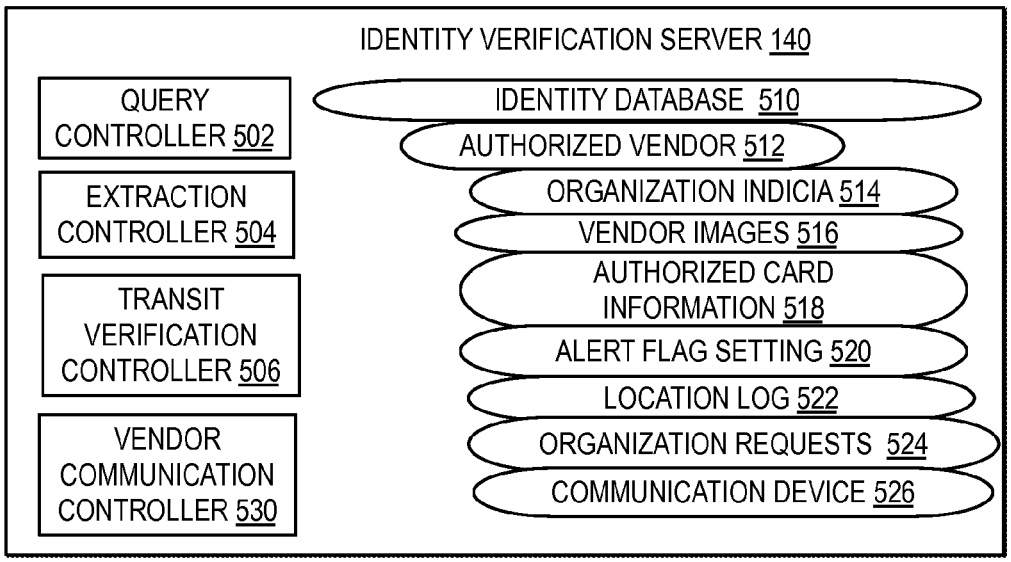
FIG. 5 illustrates a block diagram of one example of one or more components of an identity verification server.

FIG. 5 illustrates a block diagram of an example of one or more components of an identity verification server. In the example, identity verification server 140 includes a query controller 502 for receiving queries from multiple verification clients and returning results to verification clients. Query controller 502 receives a query with vendor indicia, organization indicia, and a location indicator and looks up the received query information in identity database 510. In the example, identity database 510 includes a separate record for each registered vendor 512 that includes organization indicia 514 that identify the specific organization indicia authorized for the particular vendor, where different vendors may be authorized to present different types of organization indicia. In addition, each separate record for each registered vendor 512 includes vendor images 516 that are verified images or identifying information about the vendor and authorized card information 518 that specifies the images and information on a vendor's issued identification card. Query controller 502 compares the vendor indicia received in the query with vendor images 516 and authorized card information 518 and if a matching record is identified, may also compare the organization indicia received in the query with organization indicia 514, if specified. An extraction controller of identity verification server 140 may perform additional analysis of the vendor indicia and organization indicia received in a query to determine whether the vendor indicia and organization indicia match the information stored in organization indicia 514, vendor images 516, and authorized card information 518. If query controller 502 determines that the vendor indicia and organization indicia received in the query match with a particular authorized vendor record, query controller 502 may add the location indicator received in the query to a location log 522 for the particular authorized vendor and trigger transit verification controller 506 to determine, based on previous location entries in location log 522 and the current location indicator, whether travel to the current location is feasible.

In the example, if query controller 502 identifies a particular authorized vendor record that matches the vendor indicia and organization indicia and transit verification controller 506 determines that travel to the current location is feasible, query controller 502 returns an indicator that the vendor is validated. In addition, query controller 502 may return an approved image of the vendor from vendor images 516 to the querying verification client for the verification client to display in association with the vendor's record to the user. In addition, query controller 502 may return, with a validated vendor indicator, one or more requests for output within user interface 220 of verification client 110 and one or more scripts for running if the user selects to perform a requested action, as specified in organization requests 524 of the matching authorized vendor record. Requests specified in organization requests 524 may include, but are not limited to, a request that the user at the verification client confirm that the vendor matches the image of the vendor, a request that the user indicate whether the user will meet with the vendor, and a request that the user approve a purchase of a product or service from the vendor using previously stored account information or using a user selected account from within the verification client, a request that the user assign a rating to one or more aspects of the vendor's performance, the product or service offered, or other criteria. In addition, as directed by organization requests 524, query controller 502 may return an indicator that the vendor is validated and a trigger verification client 110 to automatically open a separate application specified for the organization or prompt the user through user interface 220 with a request that the user select to open or download a separate application specified for the organization. In addition, identity verification server 140 may include additional controllers and databases for receiving responses from verification client 110, storing the responses from verification client 110, and sending the responses to a registered organization.

In one example, as a user receives a vendor validation or responds to requests sent from identity verification server 140 at verification client 110, verification server 140 may send the vendor validation conformation or user responses received from verification client 110 to a registered organization or to a mobile communication device registered to the validated vendor indicated in communication device 526. In one example, identity verification server 140 may include a vendor communication controller 530 that may perform one or more services for vendors including, but not limited to, passing responses and other data collected from verification client 110 to the registered mobile communication device for the vendor to enable a remote presentation application to communicate between the vendor's registered mobile communication device and the device hosting verification client 110.

In the example, if query controller 502 does not identify a particular authorized vendor record that matches the vendor indicia or organization indicia or transit verification controller 506 determines that travel to the current location is not feasible, query controller 502 returns an indicator that individual vendor cannot be validated, either because the vendor does not match an authorized vendor record or because the travel is not feasible. In addition, if transit verification controller 506 determines that travel is not feasible, transit verification controller 506 may perform additional actions according to alert flag setting 520, such as alerting an authority system.

Figure 6:
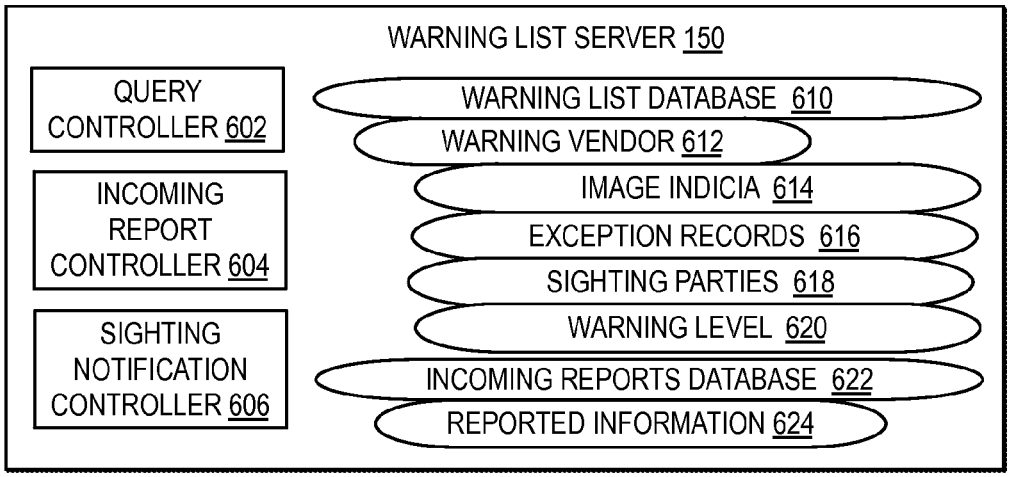
FIG. 6 illustrates a block diagram of one example of one or more components of a warning list server.

FIG. 6 illustrates a block diagram of an example of one or more components of a warning list server. In the example, warning list server 150 includes a query controller 602 for receiving queries from multiple verification clients and returning results to verification clients. Query controller 602 receives a query with vendor image indicia and other information and looks up the received query information in warning list database 610. In the example, warning list database 610 includes a separate record for each warning vendor record 612 that includes image indicia 614 that are images or identifying information about an individual and exceptions records 616 that exceptions to the image. Query controller 602 compares the image indicia received in the query with image indicia 614 and if a matching record is identified, determines whether there are an exceptions to the individual acting as a vendor in certain capacities. If query controller 602 determines that the image indicia received in the query match with a particular warning vendor record and there are no exceptions, query controller 602 may return an untrusted warning to the requesting verification client and trigger sighting notification controller 606 to send communications to one or more parties identified in sighting parties 618 with a warning level set in warning level 620. In one example, sighting notification controller 606 may send a short message service (SMS) message or other instant message to local law enforcement, with the current location, when a particular individual included in warning list database 610 has been identified.

In addition, warning list server 150 may receive incoming reports from organization ID server 120, identity verification server 140, verification clients, and other systems, with image profiles of individuals identified as misrepresenting an organizational affiliation. Incoming report controller 604 manages logging each incoming report to warning list server 150 in a separate reported information record 624 of incoming reports database 622 and may automatically create or update a warning vendor record based on each logged reported information record 624. In one example, identity verification services, insurance companies, law enforcement agencies, and other security based organizations may report image profiles to warning list server 150 of individuals who are known law offenders or of individuals who are registered as missing persons.

Figure 7:
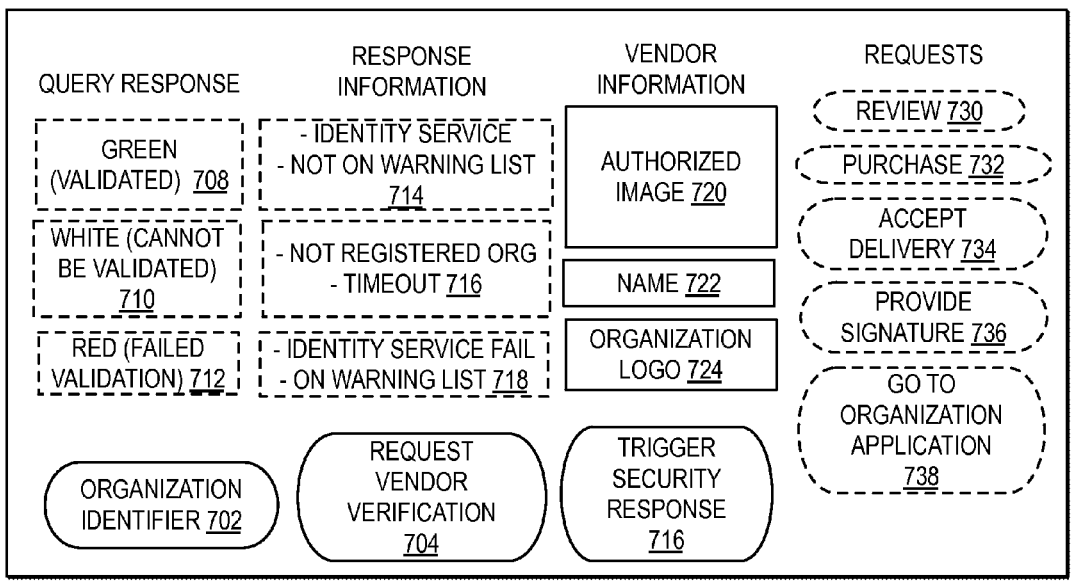
FIG. 7 illustrates a block diagram of one example of a user interface controlled by a verification client.

FIG. 7 illustrates a block diagram of one example of a user interface controlled by a verification client.

In the example, an interface 700 includes a selectable option 702 for a user to select to enter an organization identifier for a vendor organization. A user may select to type or speak an organization identifier for a vendor, trigger a camera to scan a business card with organization identifiers, or swipe a vendor identification card with organization identifiers through a reader, for example.

In the example, interface 700 includes a selectable option 704 for a user to request vendor verification by verification client 110. In response to a user selecting selectable option 704, verification client 110 may prompt a user to perform additional steps, such as providing the user with instructions to aid verification client 110 in capturing an image or audio sample of the vendor and scanning or reading any additional identifying information provided by the vendor. In the example, a response to the queries for vendor verification may be output by graphical color, text, or other indicator. In the example illustrated, the query responses are categorized as green (validated) 708, white (cannot be validated) 710, or red (failed validation) 712. In addition, additional response information may be displayed with each query response. In one example, a graphical output for green (validated) 708 is activated if identity verification server 140 returns an indicator that the vendor is validated, wherein response information 714 indicates the reasons for activating the graphical display of green (validated) 708, which may include the response from the identity verification server that a vendor is validated and may also include a response from the warning list that the vendor is not on a warning list. In the example, a graphical output for white 710 is activated if organization ID server 120 returns an indicator that the vendor's organization is not registered or verification client 110 detects a timeout for one or more of organization ID server 120, identity verification server 140 and warning list server 150, wherein response information 716 indicates the reasons for activating the graphical display of white (cannot be validated) 710. In the example, a graphical output for red (failed validation) 712 is activated if identity verification server 140 returns an indicator that the individual vendor is not validated or warning list server 150 returns an indicator that the vendor image matches an image on the warning list, wherein response information 718 indicates the reasons for activating the graphical display of red (failed validation) 712. A user may select a selectable option 716 within interface 700 to trigger a security response based on the query response.

In one example, one or more of the responses may be given priority over other responses. For example, a warning list response may be set to override all other responses for setting the graphical indicators. In this example, if an identity verification service validates a vendor, but the warning list service returns an indicator that the vendor is on a warning list, the indicator from the warning list service that a vendor is on a warning list will override all other responses and only the graphical output for red (failed validation) would be activated, but response information 714 may still indicate that the identity verification service validated the vendor.

In the example, interface 700 also includes an option to display of vendor information returned by identity verification server 140 for an authorized vendor including, but not limited to an authorized image 720, a name 722, and an organization logo 724. In addition, interface 700 also includes an option to display selectable request options for requests received from identity verification server 140 to the user including, but not limited to, a review request 730 for a user to select to review a product or service or the vendor, a purchase request 732 for the user to select to purchase or approve a purchase of a product or service, an accept delivery request 734 for a user to select to approve delivery of a product or service by the vendor at the threshold location, a provide signature request 736 for a user to select to provide a signature to authenticate that the user has verified authorized image 720 represents the vendor present or other item that needs authentication by signature, and a go to organization application request 738 for a user to select to go to an organization's separate application.

Figure 8:
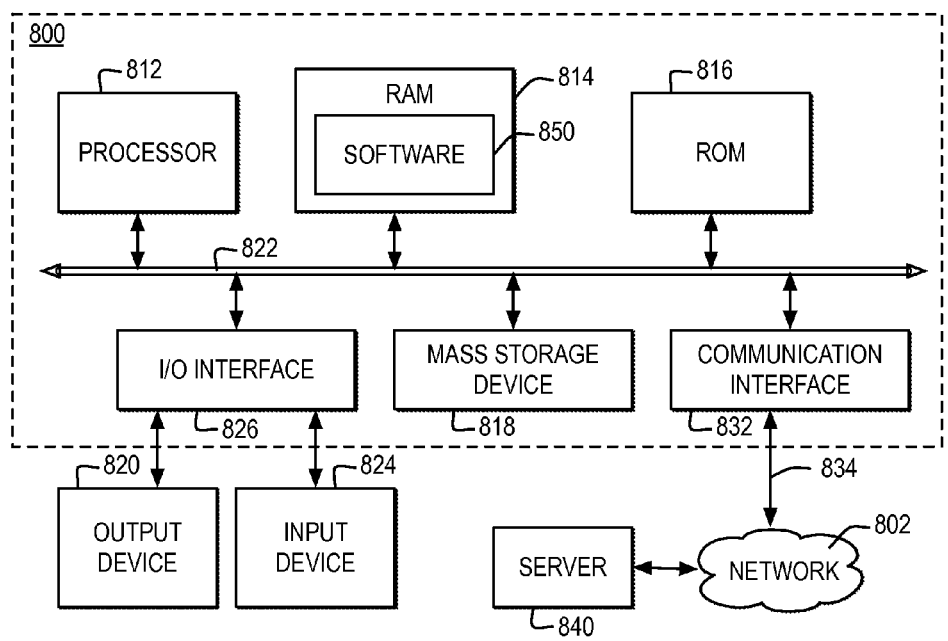
FIG. 8 illustrates a block diagram of one example of a computer system in which one embodiment of the invention may be implemented.

FIG. 8 illustrates a block diagram of one example of a computer system in which one embodiment of the invention may be implemented. The present invention, including, but not limited to, verification client 110, organization ID server 120, identity verification server 130, and warning list server 140, may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 812 may control the operations of flowchart of FIGS. 9-12 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 818, a random access memory (RAM), such as RAM 814, a read-only memory (ROM) 816, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 800, partly on the user's computer, as a stand-alone software package, partly on the user's computer and partly on a remote computer or entirely on the remote computer or server, such as server 840. In the latter scenario, the remote computer may be connected to the user's computer through any type of network, such as network 802, through a communication interface, such as network interface 832, over a network link that may be connected, for example, to network 802.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 800, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 800, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 832, the network link to network 802, and network 902 may use electrical, electromagnetic, or optical signals that carry digital data streams. The signals through the various networks and the signals on network 802, the network link to network 802, and network interface 832 which carry the digital data to and from computer system 800, may be forms of carrier waves transporting the information.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figure 9:
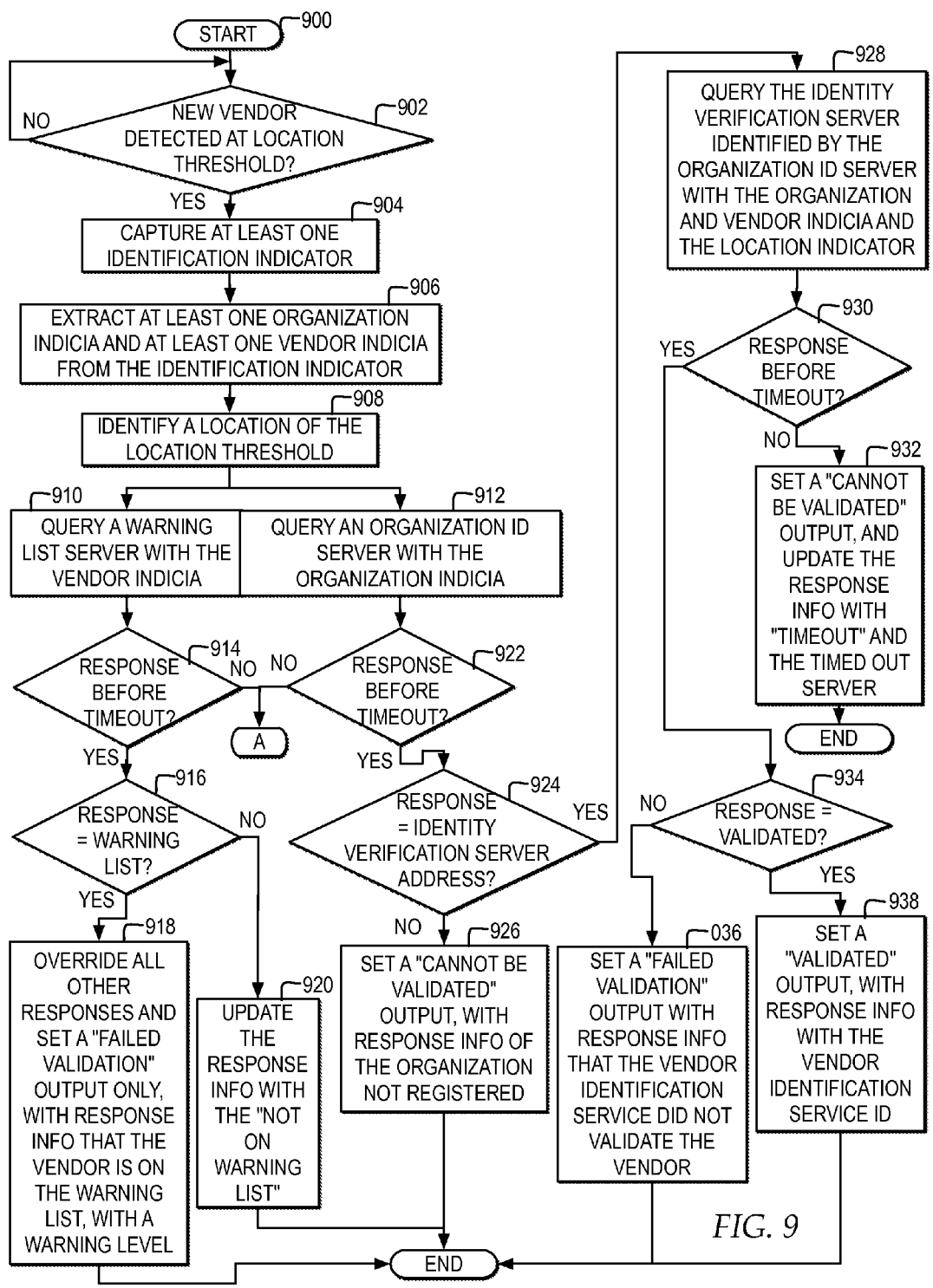
FIG. 9 illustrates a high level logic flowchart of a process and program for controlling a verification client for verifying the identity and organization affiliation of a vendor present at a threshold location.

FIG. 9 illustrates a high level logic flowchart of a process and program for controlling a verification client for verifying the identity and organization affiliation of a vendor present at a threshold location. In the example, the process starts at block 900 and thereafter proceeds to block 902. Block 902 illustrates a determination whether a new vendor is detected at a location threshold, whether by a user selecting to verify the identity of a new vendor or a capture device detecting the presence of an individual and automatically detecting a new vendor at a location threshold. At block 902, when a new vendor is detected at the location threshold, the process passes to block 904. Block 904 illustrates capturing at least one identification indicator of a vendor. Next, block 906 illustrates extracting at least one organization indicia and at least one vendor indicia from the identification indicator. Thereafter, block 908 illustrates identifying a location of the location threshold. Next, block 910 illustrates querying a warning list server with the vendor image indicia, and the process passes to block 914. Concurrently, block 912 illustrates querying an organization ID server with the organization indicia, and the process passes to block 920.

Block 914 illustrates a determination whether there is a response from the warning list server before timeout. At block 914, if there is not a response from the warning list server before timeout, then the process passes to block 932. Block 932 illustrates setting a "cannot be validated" output, and updating the response information with "timeout" and the timed out server identifier, and the process ends.

Returning to block 914, if there is a response from the warning list server before timeout, the process passes to block 918. Block 918 illustrates a determination whether a response from the warning list server is that the vendor is on the warning list. At block 916, if the warning list server indicates the vendor is on the warning list, then the process passes to block 918. Block 918 illustrates overriding all other responses and setting a "failed validation" output only, with response information set that the vendor is on the warning list, with a warning level, if returned, and the process ends. Returning to block 916, if the response from the warning list server is that the vendor is not on the warning list, then the process passes to block 918. Block 918 illustrates updating the response information for output in the user interface with the "not on warning list" indicator, and the process ends.

Returning to block 922, block 922 illustrates a determination of whether there is a response from the organization ID server before timeout. At block 922, if there is not a response from the organization ID server before timeout, then the process passes to block 932. At block 922, if there is a response from the organization ID server before timeout, then the process passes to block 924. Block 924 illustrates a determination of whether the response is an identity verification server address. At block 924, if the response is not an identity verification server address, then the process passes to block 926. Block 926 illustrates setting a "cannot be validated" output with response information including that the organization is not registered. Returning to block 924, if the response is an identity verification server address, then the process passes to block 928. Block 928 illustrates querying the identity verification server identified by the organization ID server with the organization and vendor indicia and the location information. Next, block 930 illustrates a determination whether a response is received from the identity verification server before timeout. At block 930, if a response is not received from the identity verification server before timeout, then the process passes to block 932. At block 930, if a response is received from the identity verification server before timeout, then the process passes to block 934. Block 934 illustrates a determination whether the response indicates the vendor is validated. At block 934, if the response indicates the vendor is validated, then the process passes to block 938. Block 938 illustrates setting a "validated" output, with response information indicating the vendor identification service ID, and the process ends. Returning to block 934, if the response indicates the vendor is not validated, then the process passes to block 936. Block 936 illustrates setting a "failed validation" output with response information indicating that the vendor identification service did not validate the vendor, and the process ends.

FIG. 10 illustrates a high level logic flowchart of a process and program for controlling an organization ID server within a threshold verification system. In the example, the process starts at block 1000 and thereafter proceeds to block 1002. Block 1002 illustrates a determination whether am organization ID server receives a query, including organization indicia. At block 1002, if a query is received, then the process passes to block 1004. Block 1004 illustrates a determination whether the organization indicia requires additional analysis to identify additional markings indicating the organization affiliation of a vendor. At block 1004, if the organization indicia require additional analysis to identify additional markings indicating the organization affiliation of a vendor, then the process passes to block 1006. Block 1006 illustrates extracting additional information from the organization indicia, and the process passes to block 1008. Returning to block 1004, if the organization indicia does not require additional analysis to identify additional markings indicating the organization affiliation of a vendor, then the process passes to block 1008.

Block 1008 illustrates comparing the organization indicia with the registered organization words and marks in the connection database. Next, block 1010 illustrates a determination whether there is a match between the organization indicia and a particular registered organization entry. At block 1010 if there is a match between the organization and a particular registered organization entry, then the process passes to block 1012. Block 1012 illustrates returning a query result with the identity verifications service address from the matching registered organization entry, and the process ends. Returning to block 1010, if there is not a match between the organization and a particular registered organization entry, then the process passes to block 1014. Block 1014 illustrates returning a query result indicating the organization is not registered, and the process ends.

FIG. 11 illustrates a high level logic flowchart of a process and program for controlling a warning list server within a threshold verification system. In the example, the process starts at block 1100 and thereafter proceeds to block 1102. Block 1102 illustrates a determination whether the warning list server receives a query, including vendor image indicia and current location. At block 1102, if the warning list server receives a query, then the process passes to block 1104. Block 1104 illustrates a determination whether the vendor image indicia requires additional analysis to identify image characteristics from the vendor image indicia. At block 1104, if the vendor image indicia require additional analysis, then the process passes to block 1106. Block 1106 illustrates extracting additional information from the vendor image indicia, and the process passes to block 1108. Returning to block 1104, if the vendor image indicia does not require additional analysis, then the process passes to block 1108.

Block 1108 illustrates comparing the vendor image indicia with the warning image entries in the warning list database. Next, block 1110 illustrates a determination whether there is a match between the vendor image indicia and a particular warning image indicia, then the process passes to block 1118. Block 1118 illustrates returning a query result with an indicator that there is no matching entry on the warning list, and the process ends. Returning to block 1110 if there is a match, then the process passes to block 1112. Block 1112 illustrates a determination whether the image indicia is on an exception list. At block 1112, if the image indicia are on the exception list, then the process passes to block 1118. At block 1112, if the image indicia are not on the exception list, then the process passes to block 1114. Block 1114 illustrates returning a query result of the vendor is on the warning list with a warning flag set to a warning level for the matching warning entry. Next, block 1116 illustrates transmitting a warning communication to the identified sighting party with the vendor image indicia, matching warning image entry, and current location, and the process ends.

Figure 12:
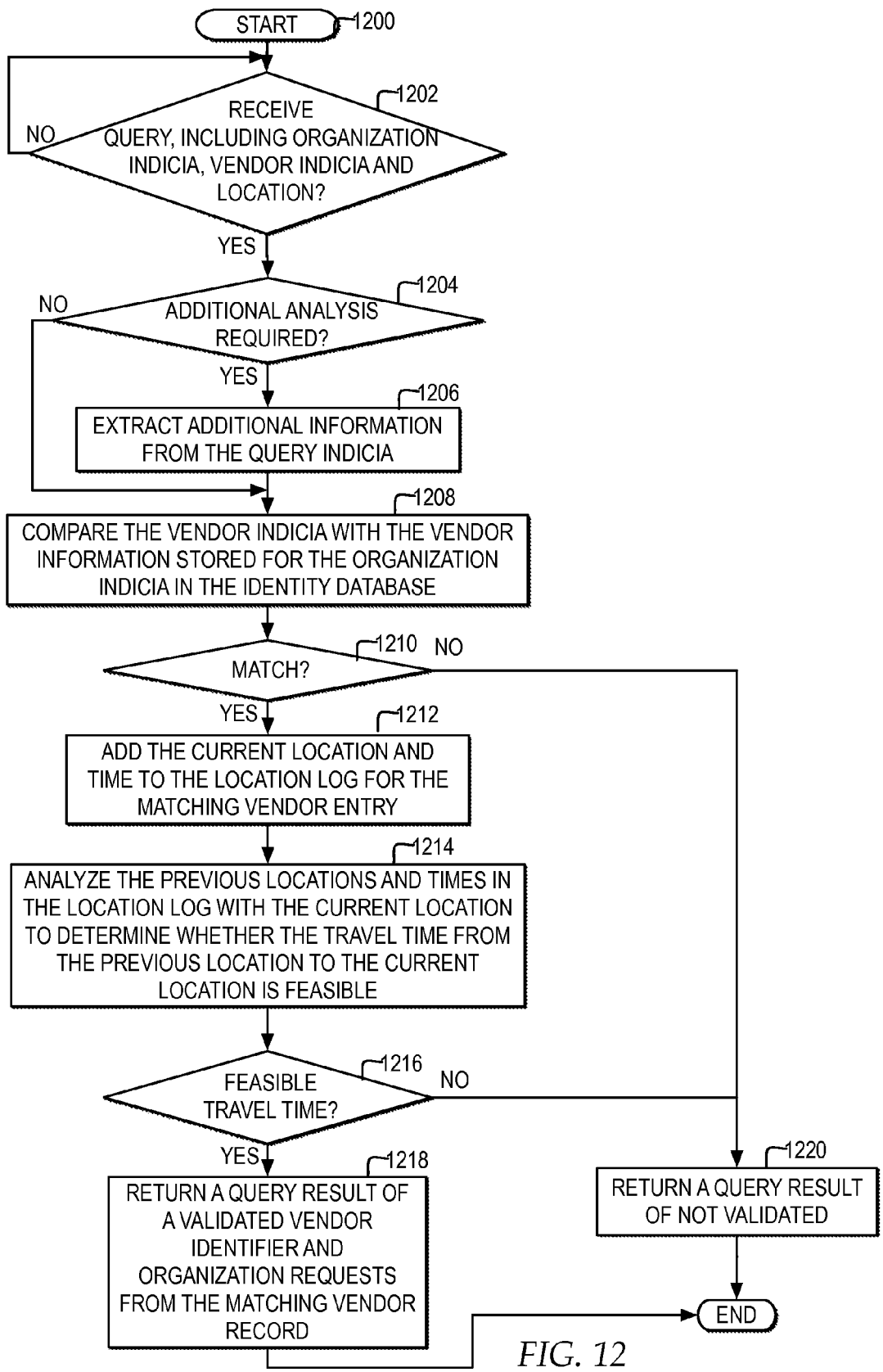
FIG. 12 illustrates a high level logic flowchart of a process and program for controlling an identity verification server within a threshold verification system.

FIG. 12 illustrates a high level logic flowchart of a process and program for controlling an identity verification server within a threshold verification system. In the example, the process starts at block 1200 and thereafter proceeds to block 1202. Block 1202 illustrates a determination whether an identity verification server receives a query, including organization indicia, vendor indicia, and location. At block 1202, if the identity verification server receives a query, then the process passes to block 1204. Block 1204 illustrates a determination whether additional analysis is required of the indicia provided. At block 1204, if additional analysis is required, then the process passes to block 1206. Block 1206 illustrates extracting additional information from the query indicia, and the process passes to block 1208. Returning to block 1204, if no additional analysis is required, then the process passes to block 1208.

Block 1208 illustrates comparing the vendor indicia with the information in the vendor entries, such as images, name, and other unique data, and the query organization indicia with the organization indicia in the database records. Next, block 1210 illustrates a determination whether there is a record in the vendor information matching the vendor indicia, and matching organization indicia. At block 1210, if there is not a record in the vendor information matching the vendor indicia, and matching organization indicia, then the process passes to block 1220. Block 1220 illustrates returning a query result of not validated, and the process ends.

Returning to block 1210, if there is a record with vendor images matching the vendor indicia, and matching organization indicia, then the process passes to block 1212. Block 1212 illustrates adding the current location and time to the location log for the matching vendor entry. Next, block 1214 illustrates analyzing the previous locations and times in the location log with the current location to determine whether the travel time from the previous location to the current location is feasible. Next, block 1216 illustrates a determination whether the travel time is feasible, taking into account any additional factors includes modes of transportation available, traffic, historical travel times for the vendor, the vendor's planned scheduled accessible from the vendor's organization calendar, and other travel related information. At block 1216, if the travel time is not feasible, then the process passes to block 1220. Returning to block 1216, if the travel time is feasible, then the process passes to block 1218. Block 1218 illustrates returning a query result of a validated vendor identifier from the matching vendor record, along with any organization requests and associated scripts, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for verifying vendor identification and organization affiliation, comprising:
   capturing, by a verification client using at least one processor, at least one identification indicator of an individual arriving at a location threshold representing themself as a vendor of an organization;
   extracting, by the verification client, at least one vendor indicia identifying the individual and at least one organization indicia identifying the organization from the captured at least one identification;
   sending, by the verification client, at least one first query comprising the at least one organization indicia to an organization identification service that maintains a database of a plurality of organizations each registered with the organization identification by at least one of a plurality of identity verification services;
   responsive to the verification client receiving a first response from the organization identification service with a network address of a particular identity verification service associated with the at least one organization indicia from among the plurality of identity verification services, sending, by the verification client, at least one second query comprising the vendor indicia and the current location of the location threshold to the particular identity verification service that maintains a database of records for a plurality of vendors affiliated with the organization; and
   responsive to the verification client receiving a second response from the particular identity verification service indicating that the user is validated, notifying, by the verification client, the user via a user interface that the individual is validated as the vendor of the organization.

2. The method according to claim 1, further comprising:
   sending, by the verification client, at least one additional query comprising the vendor indicia to a warning list service to determine whether the individual representing themself as the vendor of the organization is on a warning list and is not validated; and
   responsive to the verification client receiving a separate indicator from the warning list service indicating that the user is on a warning list, notifying the user that the individual has failed validation.

3. The method according to claim 2, wherein notifying the user that the individual has failed validation further comprises:
   controlling output in a user interface of a query response indicating the individual failed validation and overriding the notification that the individual is validated as the vendor of the organization by the particular identity verification service.

4. The method according to claim 1, wherein capturing, by a verification client using at least one processor, at least one identification indicator of an individual arriving at a location threshold representing oneself as a vendor of an organization and extracting, by the verification client, at least one vendor indicia identifying the individual and at least one organization indicia identifying the organization from the captured at least one identification, further comprise:
   capturing, using a camera, a first image of the individual for the at least one identification indicator;
   extracting the first image from the at least one identification indicator as the vendor indicia;
   capturing, using the camera, a second image of an identification card for the at least one identification indicator; and
   extracting text from the second image of the identification card indicating a name of the organization as the organization indicia.

5. The method according to claim 1, further comprising:
   responsive to receiving the first response to the first query from the organization identification service indicating that the organization identified in the organization indicia is not a registered organization with the organization identification service, controlling output to a user interface indicating that the vendor cannot be validated because the organization identified in the organization is not registered with the organization identification service.

6. The method according to claim 1, further comprising:
responsive to the verification client receiving the second response from the particular identity verification service indicating that the user cannot be validated, notifying, by the verification client, the user via a user interface that the individual failed validation as the vendor of the organization.

7. The method according to claim 1, further comprising:
responsive to the verification client detecting a timeout by one or more of the organization identification service and the particular identity verification service, notifying the user via the user interface that the individual cannot be validated because of the timeout.

8. The method according to claim 1, further comprising:
responsive to a user selection to start the verification client on a portable communication device, running the verification client on the portable communication device that provides communication services.

9. The method according to claim 1, further comprising:
receiving, from the particular identity verification service, a request to output to the user to perform an action and a script for enabling the user to perform the action;
responsive to receiving the request to output to the user to perform the action, controlling output of the request as a selectable option via the user interface of the verification client; and
responsive to the user selecting the selectable option, triggering the user interface to initiate the script for enabling the user to perform the action.

10. A system for verifying vendor identification and organization affiliation, comprising:
a verification client operative on at least one processor to capture at least one identification indicator of an individual arriving at a location threshold representing themself as a vendor of an organization;
the verification client operative to extract at least one vendor indicia identifying the individual and at least one organization indicia identifying the organization from the captured at least one identification;
the verification client operative to send at least one first query comprising the at least one organization indicia to an organization identification service that maintains a database of a plurality of organizations each registered with the organization identification by at least one of a plurality of identity verification services;
the verification client, responsive to the verification client receiving a first response from the organization identification service with a network address of a particular identity verification service associated with the at least one organization indicia from among the plurality of identity verification services, operative to send at least one second query comprising the vendor indicia and the current location of the location threshold to the particular identity verification service that maintains a database of records for a plurality of vendors affiliated with the organization; and
the verification client, responsive to the verification client receiving a second response from the particular identity verification service indicating that the user is validated, operative to notify the user via a user interface that the individual is validated as the vendor of the organization.

11. The system according to claim 10, further comprising:
the verification client operative to send at least one additional query comprising the vendor indicia to a warning list service to determine whether the individual representing themself as the vendor of the organization is on a warning list and is not validated; and
the verification client, responsive to the verification client receiving a separate indicator from the warning list service indicating that the user is on a warning list, operative to notify the user that the individual has failed validation.

12. The system according to claim 11, further comprising:
the verification client operative to control output in a user interface of a query response indicating the individual failed validation and overriding the notification that the individual is validated as the vendor of the organization by the particular identity verification service.

13. The system according to claim 10, further comprising:
the verification client operative to capture, using a camera, a first image of the individual for the at least one identification indicator;
the verification client operative to extract the first image from the at least one identification indicator as the vendor indicia;
the verification client operative to capture, using the camera, a second image of an identification card for the at least one identification indicator; and
the verification client operative to extract text from the second image of the identification card indicating a name of the organization as the organization indicia.

14. The system according to claim 10, further comprising:
the verification client, responsive to receiving the first response to the first query from the organization identification service indicating that the organization identified in the organization indicia is not a registered organization with the organization identification service, operative to control output to a user interface indicating that the vendor cannot be validated because the organization identified in the organization is not registered with the organization identification service.

15. The system according to claim 10, further comprising:
the verification client, responsive to the verification client receiving the second response from the particular identity verification service indicating that the user cannot be validated, operative to notify the user via a user interface that the individual failed validation as the vendor of the organization.

16. The system according to claim 10, further comprising:
the verification client, responsive to the verification client detecting a timeout by one or more of the organization identification service and the particular identity verification service, operative to notify the user via the user interface that the individual cannot be validated because of the timeout.

17. The system according to claim 10, further comprising:
the verification client, responsive to a user selection to start the verification client on a portable communication device, operative to run the verification client on the portable communication device that provides communication services.

18. The system according to claim 10, further comprising:
the verification client operative to receive, from the particular identity verification service, a request to output to the user to perform an action and a script for enabling the user to perform the action;
the verification client, responsive to receiving the request to output to the user to perform the action, operative to control output of the request as a selectable option via the user interface of the verification client; and the verification client, responsive to the user selecting the selectable option, operative to trigger the user interface to initiate the script for enabling the user to perform the action.

19. A computer program product for verifying vendor identification and organization affiliation, the computer program product comprising:

one or more computer-readable tangible storage devices;

program instructions, stored on at least one of the one or more storage devices, to capture at least one identification indicator of an individual arriving at a location threshold representing themself as a vendor of an organization;

program instructions, stored on at least one of the one or more storage devices, to extract at least one vendor indicia identifying the individual and at least one organization indicia identifying the organization from the captured at least one identification;

program instructions, stored on at least one of the one or more storage devices, to send at least one first query comprising the at least one organization indicia to an organization identification service that maintains a database of a plurality of organizations each registered with the organization identification by at least one of a plurality of identity verification services;

program instructions, stored on at least one of the one or more storage devices, responsive to the verification client receiving a first response from the organization identification service with a network address of a particular identity verification service associated with the at least one organization indicia from among the plurality of identity verification services, to send at least one second query comprising the vendor indicia and the current location of the location threshold to the particular identity verification service that maintains a database of records for a plurality of vendors affiliated with the organization; and program instructions, stored on at least one of the one or more storage devices, responsive to the verification client receiving a second response from the particular identity verification service indicating that the user is validated, to notify the user via a user interface that the individual is validated as the vendor of the organization.

20. The computer program product according to claim 19, further comprising:

program instructions, stored on at least one of the one or more storage devices, to send at least one additional query comprising the vendor indicia to a warning list service to determine whether the individual representing themself as the vendor of the organization is on a warning list and is not validated; and program instructions, stored on at least one of the one or more storage devices, responsive to the verification client receiving a separate indicator from the warning list service indicating that the user is on a warning list, to notify the user that the individual has failed validation.

* * * * *